(12) United States Patent
Howard

(10) Patent No.: US 12,179,563 B2
(45) Date of Patent: Dec. 31, 2024

(54) DUAL MODE JEEP COVER

(71) Applicant: My Wet Willy, LLC, Wilson, NC (US)

(72) Inventor: Alan Ray Howard, Wilson, NC (US)

( * ) Notice: Subject to any disclaimer, the term of this patent is extended or adjusted under 35 U.S.C. 154(b) by 0 days.

(21) Appl. No.: 16/939,819

(22) Filed: Jul. 27, 2020

(65) Prior Publication Data

US 2022/0024290 A1    Jan. 27, 2022

(51) Int. Cl.
*B60J 11/04* (2006.01)
*E04H 15/06* (2006.01)
*E04H 15/40* (2006.01)

(52) U.S. Cl.
CPC .............. *B60J 11/04* (2013.01); *E04H 15/06* (2013.01); *E04H 15/405* (2013.01)

(58) Field of Classification Search
CPC .................................. B60J 11/04; E04H 15/06
See application file for complete search history.

(56) References Cited

U.S. PATENT DOCUMENTS

| | | | | |
|---|---|---|---|---|
| 1,719,055 A * | 7/1929 | Herzer | ..................... | B60J 11/02 296/136.03 |
| 4,188,963 A | 2/1980 | Janoe et al. | | |
| 4,720,135 A * | 1/1988 | Farina | ..................... | B60J 11/02 296/136.03 |
| 4,858,985 A * | 8/1989 | Wojcik | ..................... | B60J 11/02 296/136.03 |
| 5,176,421 A * | 1/1993 | Fasiska | ..................... | B60J 11/02 296/136.03 |
| 5,400,813 A * | 3/1995 | Swan, Jr. | ................. | E04H 15/08 135/119 |
| 5,567,002 A * | 10/1996 | Tair | ........................... | B60J 11/02 296/136.03 |
| 5,803,529 A | 9/1998 | Perry-Bores et al. | | |
| 5,845,958 A * | 12/1998 | Rudys | ....................... | B60J 11/06 296/136.08 |
| 6,206,454 B1 | 3/2001 | Cory | | |
| 6,338,522 B1 | 1/2002 | LeBlanc | | |
| 6,505,880 B1 * | 1/2003 | Castro | ........................ | B60J 7/10 296/147 |
| 7,789,097 B1 * | 9/2010 | Sotirkys | ................... | E04H 15/06 135/88.01 |
| 9,248,730 B2 * | 2/2016 | Hu | ........................... | B60J 11/04 |
| 9,701,185 B1 * | 7/2017 | Usanga | ..................... | B60J 11/02 |
| 9,925,928 B2 * | 3/2018 | Poudrier | ................. | B60R 9/045 |

(Continued)

FOREIGN PATENT DOCUMENTS

GB        869858 A *   6/1961   ............. E04H 15/06
KR    880000074 Y1 *   3/1988

(Continued)

OTHER PUBLICATIONS

"Ripstop." Wikipedia, May 29, 2020, https://en.wikipedia.org/wiki/Ripstop. Accessed Jun. 17, 2020.

(Continued)

*Primary Examiner* — David R Dunn
*Assistant Examiner* — Danielle Jackson
(74) *Attorney, Agent, or Firm* — Ashley D. Johnson; Dogwood Patent and Trademark Law

(57) ABSTRACT

A dual functioning apparatus that serves as a cover for a vehicle and as a shelter, which is easily converted and positioned off the back of the vehicle and is attached to the top back cross roll bar of the vehicle for storage.

9 Claims, 3 Drawing Sheets

(56) References Cited

U.S. PATENT DOCUMENTS

| | | | | |
|---|---|---|---|---|
| D842,217 S | * | 3/2019 | Nielsen | E04H 15/06 |
| | | | | D12/401 |
| 10,378,234 B1 | * | 8/2019 | Nielsen | E04H 15/08 |
| 10,787,067 B2 | * | 9/2020 | Nania | E04H 15/06 |
| 2002/0145306 A1 | * | 10/2002 | McGrath, Jr. | B64F 1/005 |
| | | | | 296/136.1 |
| 2005/0087220 A1 | * | 4/2005 | Christensen | E04H 15/06 |
| | | | | 135/88.16 |
| 2006/0049652 A1 | * | 3/2006 | Martin | E04H 15/06 |
| | | | | 296/26.08 |
| 2019/0202274 A1 | * | 7/2019 | Bates | B60J 11/04 |

FOREIGN PATENT DOCUMENTS

| | | | |
|---|---|---|---|
| KR | 890004205 Y1 | * | 6/1989 |
| KR | 890008182 Y1 | * | 11/1989 |
| KR | 900004968 Y1 | * | 6/1990 |
| KR | 200203736 Y1 | * | 11/2000 |

OTHER PUBLICATIONS

"Jeep." Wikipedia, https://en.wikipedia.org/wiki/Jeep. Accessed Jun. 18, 2020.

Tanabe, Jennifer, "Jeep" https://www.newworldencyclopedia.org/entry/Jeep, Jun. 3, 2019; pp. 1-8, New World Encyclopedia. Accessed Dec. 15, 2021.

* cited by examiner

DUAL MODE JEEP COVER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a vehicle cover. In particular, it relates to a vehicle cover that serves a dual function convertible from a cover for the vehicle to a rain fly off the back of the vehicle.

Description of Related Art

Utility vehicles such as Jeep® style vehicles have a completely removable top that drapes over the roll bar of the vehicle and attaches to the sides to form a roof. The doors are not covered since the tops are intended to be used while driving. The tops can either be a hard top or a soft top and are made of a number of different materials and cloths. Some of these tops allow sunlight in, e.g., mesh type fabrics, while others are designed to keep the sunlight out of the interior.

The concept of a tent for use on a vehicle has been utilized including the provision of sideboards; however, they require an extensive framework of metal pipes and bars to support the tent. The tents then become quite bulky and not practical to carry in the vehicle full time. In addition, they are extremely heavy and take up a substantial amount of room when in a folded configuration. The tent does not cover the doors or windows in any manner. In addition, the device would be quite expensive to manufacture and would not be very practical to use.

BRIEF SUMMARY OF THE INVENTION

The present invention relates to a dual mode cover. In one mode, the ripstop nylon fabric cover covers the top, sides, back, and doors, either laid on the vehicle or attached, e.g., by magnets, hook and loop fasteners, or straps. The same cover can then be moved backwards, with one end attaching to the top cross roll bar on a first end and one or more tent poles on a second end to form a shelter. A guy line and sand bag can optionally be used to stabilize the shelter configuration.

Accordingly, in one embodiment, there is a cover for a vehicle which can alternatively serve as a shelter positioned off the back of the vehicle comprising:
 a) ripstop nylon fabric configured to cover the top, doors, and side windows of the vehicle and which alternatively can also be placed off the back of the vehicle to form a shelter, which is connected to a roll bar of the vehicle on a first side of the ripstop nylon fabric;
 b) one or more tent poles for supporting the ripstop nylon fabric on a second side of the ripstop nylon fabric, wherein the ripstop nylon fabric is utilized as a shelter; and
 c) a bag designed to hang from a top cross piece roll bar, which is of a size to contain the ripstop nylon fabric cover and the one or more tent poles.

DETAILED DESCRIPTION OF THE INVENTION

Figure 1:
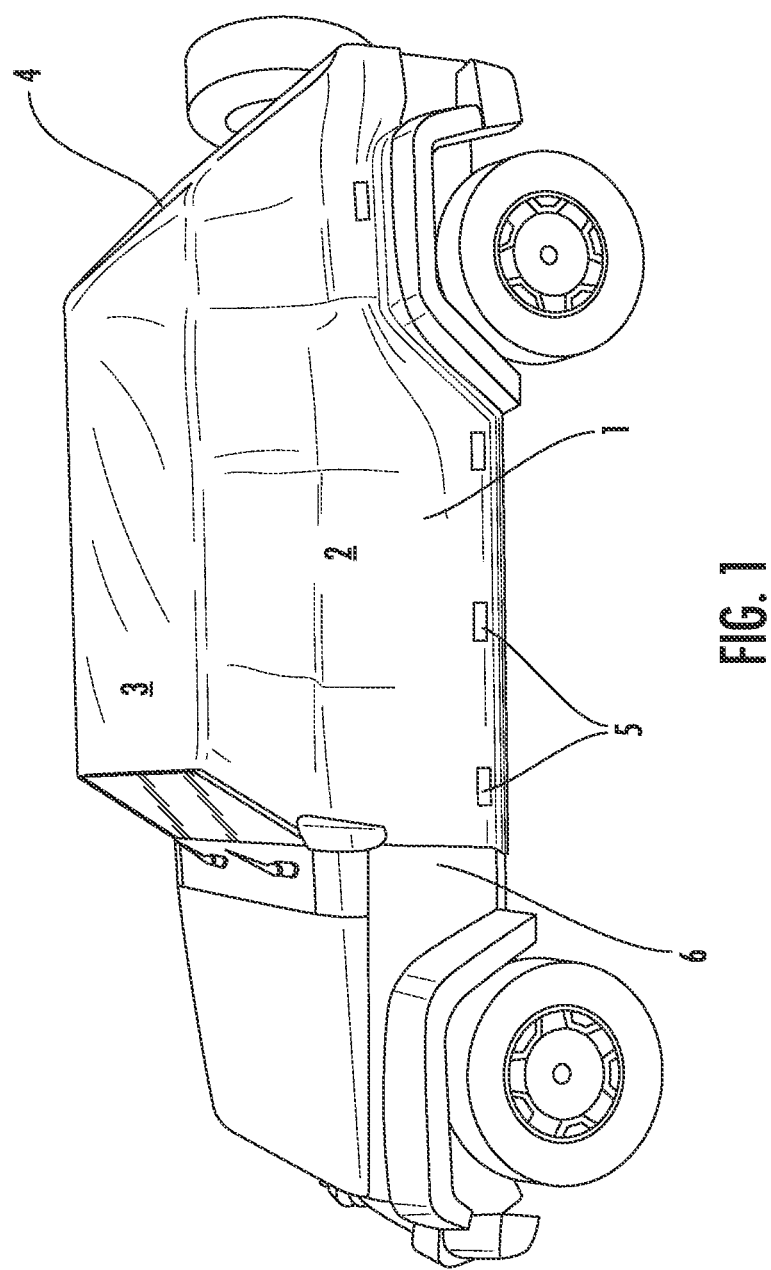
FIG. 1 is a perspective view of the cover of the present invention, covering the vehicle.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "cover" refers to a piece of ripstop nylon fabric in a shape such that it can become not only the roof of the vehicle, but it also covers side doors and windows. This is designed not for driving but to keep moisture out of the vehicle from all possible entry points. As noted in FIG. 1, the cover is configured to cover the top, back, doors, and side windows (if any). When installed, it has a generally flat top with sides on the left, right, and back that cover all the entry points of rain, i.e., the doors, windows, and open back area. It is, in one embodiment, attached to at least a portion of the roll bar (top or sides) to hold it in place. In another embodiment, the sides and back portion of the cover are attached to the vehicle by any means compatible with ripstop nylon fabric and the vehicle itself. Examples include, but are not limited to, hook and loop fasteners, snaps, hooks, straps, magnets, and the like. In one embodiment, there are four straps holding the cover.

As used herein, the term "jeep" in lowercase, is used as a generic term for vehicles inspired by the Jeep® vehicle that are suitable for use on rough terrain. They have in common the open sides and backs, the roll bars, and in many cases, these vehicles lack side windows or even side doors. The general shape of such vehicles is shown in the figures, especially FIG. 1. Of note is this version of a vehicle which has a roll bar frame with bars on the sides and top, which can be utilized to support the cover of the present invention.

Figure 2:
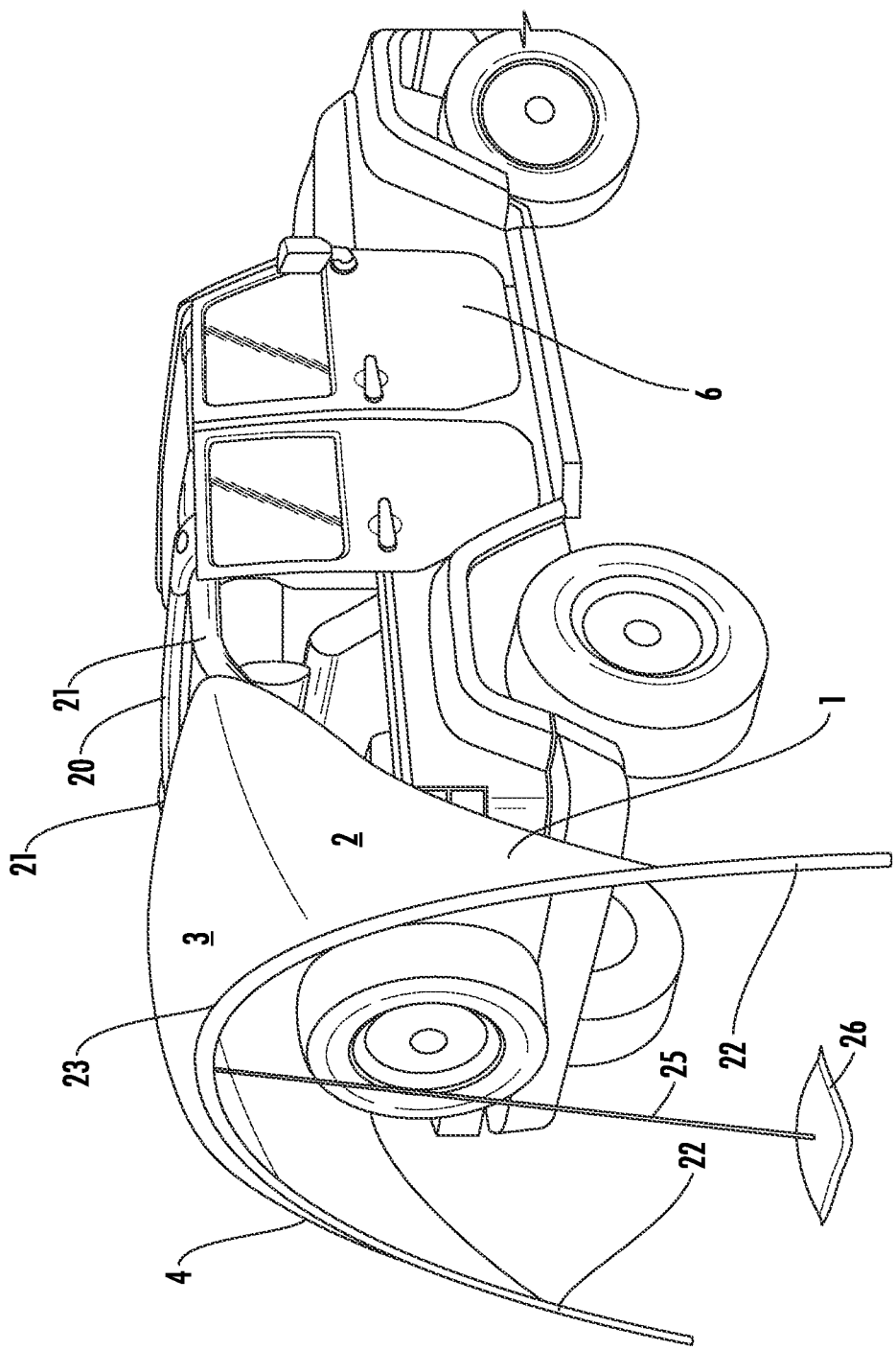
FIG. 2 is a perspective view of the cover of the present invention mounted off the back of the vehicle used as a shelter.

As used herein, the term "shelter or sun shade" refers to a cover supported on one end (a first side) by attachment to a top roll bar and on the other (second) side by one or more tent poles. A canopy does not have a floor and only has some side coverage. The drawings show that the parts of the cover that drape over the doors and window areas become sidewalls to the cover when in rain fly position. The fabric is thin, resists tearing, and is easy to move between cover and canopy. In one embodiment, a guy line and sand bag are used to stabilize the shelter configuration, as seen in FIG. 2.

As used herein, the term "ripstop nylon fabric" refers to a woven fabric made of nylon. During weaving, thick reinforcement yarns are interwoven at regular intervals in a crosshatch pattern. The intervals are typically in the range of about 5 to 8 millimeters. It also refers to like materials that are not technically ripstop but provide the same protection, e.g., DFC composite, polyester, mesh, and the like, including more than one material.

As used herein, the term "connected to a roll bar" refers to a metal bar running up the sides and across the top of the vehicle. It is used for strengthening the vehicle frame and protecting the occupants, should the vehicle overturn.

As used herein, the term "tent poles" refers to one or more poles that are used to port a tent or in this case, a canopy. They can be a single piece but, in one embodiment, they are collapsible, e.g., by coming apart into pieces or telescoping to a smaller size especially to fit in the bag of the present invention. In one embodiment, there are two poles and in another embodiment, there is a single half-moon pole. A guy line and sand bag can also be utilized.

As used herein, the term "top cross piece roll bar" refers to the part of the roll bar that is at the top of the roll bar frame and crosses from one side of the vehicle to the other side and not front to back.

As used herein, the term "bag" refers to a container made of flexible material with an opening at the top, used for carrying the ripstop nylon fabric and the poles. It is designed to be hung from the top cross piece roll bar, either in a permanent or a removable fashion. In one embodiment, the ripstop nylon fabric is attached (e.g., by sewing or other means) to the bag.

As used herein, the term "attached" refers to the cover, in one embodiment, being attached to the vehicle by hook and loop fasteners, straps, magnets, and the like, rather than just being laid across the roll bar frame.

Now referring to the drawings, FIG. 1 is a perspective view of the ripstop nylon fabric cover of the present invention on a vehicle in the covered position. In this view, cover 1 covers the sides 2 (only left side shown), top 3, and back 4 on vehicle 6, leaving the windshield uncovered since it is not an entry point of rain. While the cover can just be laid on top of the vehicle, in this view, magnets 5 are utilized at the bottom of the sides of the vehicle and the back to hold the cover in place. Internal ties could also be utilized, tying the cover to the roll bar frame, seen in FIG. 2.

FIG. 2 shows a perspective view of the same cover 1 situated off the back of the vehicle 6 in the shelter position. The first side 20 is connected to the top cross piece roll bar frame 21 and a single half-moon shaped pole 22 which supports the second side 23 of the shelter. The roll bar frame 21 has upright portions and cross portions creating a roll cage to protect the driver. An optional guy line 25 is held down by sand bag 26 to stabilize the shelter configuration.

Figure 3:
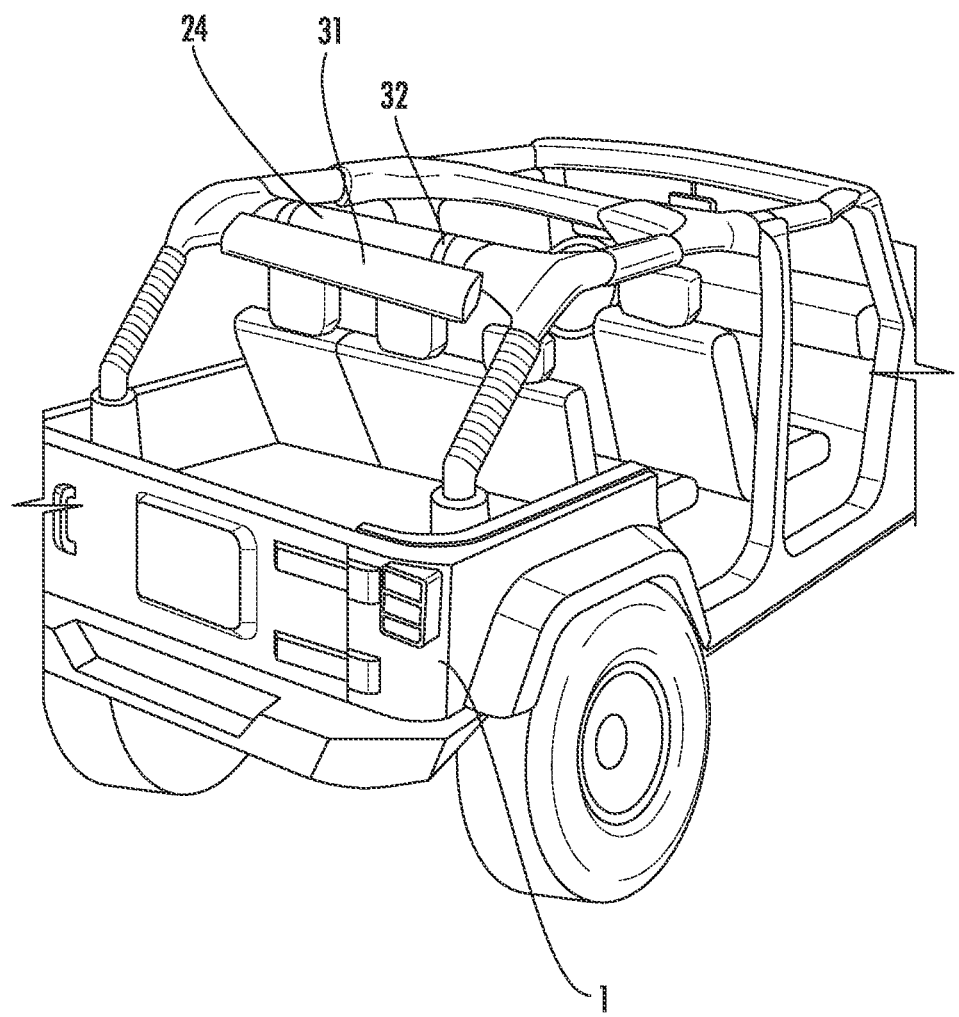
FIG. 3 shows a perspective view of the bag to hold the cover and tent poles of the present invention.

FIG. 3 shows bag 31 for carrying the tent poles 22 and cover 1 attached by straps 32 to top cross roll bar 24. In one embodiment, the cover is attached to the bag.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A cover for a vehicle defined by a vehicle top, a pair of vehicle sides, a back roll bar, and a vehicle back end, the cover comprising:
   a. ripstop nylon fabric configured to cover the vehicle top, pair of sides, and back end in a first orientation, the fabric designed to keep moisture out of the vehicle from all possible entry points in the first orientation; wherein a first end of the fabric is attached to the back roll bar of the vehicle and a second end of the fabric is extended from the back end of the vehicle and away from the vehicle back end to form a shelter that partially covers a storage area of the vehicle between an area behind the back roll bar and the back end of the vehicle while still attached to the back roll bar in a second orientation;
   b. a single half-moon shaped tent pole for supporting an entire edge of the second end of the fabric when the cover is utilized as a shelter in the second orientation, wherein a length of the edge of the second end of the fabric extends partially along the tent pole to create an angled side region;

c. a bag designed to hang from the back roll bar, which is of a size to contain the fabric and the tent pole when the cover is not in use.

2. The fabric of claim 1, wherein the cover is attached to the bag.

3. The cover of claim 1, wherein the tent pole is collapsible.

4. The cover of claim 1, further comprising a guy line secured by a sand bag.

5. The cover of claim 1, further comprising a plurality of magnets that cooperate with magnets positioned on the vehicle for proper positioning of the fabric in the first orientation.

6. The cover of claim 5, wherein the magnets are positioned at a first and second lower side edge of the fabric in the first orientation.

7. The cover of claim 1, wherein the fabric is configured with a generally flat top with a left side, a right side, and a back side that together cover vehicle windows and the back end.

8. The fabric of claim 1, wherein the cover is attached to the roll bar using hook and loop fasteners, snaps, hooks, straps, or magnets.

9. The cover of claim 1, wherein the fabric is supported on the first end by attachment to the roll bar and on the second end by the tent pole.

* * * * *